US010602374B2

(12) United States Patent
Miao et al.

(10) Patent No.: US 10,602,374 B2
(45) Date of Patent: Mar. 24, 2020

(54) USER EQUIPMENT (UE) AND METHODS FOR DYNAMIC MILLIMETER WAVE PENCIL CELL COMMUNICATION

(71) Applicant: Intel IP Corporation, Santa Clara, CA (US)

(72) Inventors: Honglei Miao, Munich (DE); Huaning Niu, Milpitas, CA (US); Michael Faerber, Wolfratshausen (DE)

(73) Assignee: Apple Inc., Cupertino, CA (US)

( * ) Notice: Subject to any disclaimer, the term of this patent is extended or adjusted under 35 U.S.C. 154(b) by 87 days.

(21) Appl. No.: 15/747,273

(22) PCT Filed: Nov. 19, 2015

(86) PCT No.: PCT/US2015/061486
§ 371 (c)(1),
(2) Date: Jan. 24, 2018

(87) PCT Pub. No.: WO2017/019116
PCT Pub. Date: Feb. 2, 2017

(65) Prior Publication Data
US 2018/0220308 A1    Aug. 2, 2018

Related U.S. Application Data

(60) Provisional application No. 62/198,247, filed on Jul. 29, 2015.

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04W 16/32* (2013.01);
(Continued)

(58) Field of Classification Search
CPC ..... H04W 16/28; H04W 16/32; H04W 24/10; H04W 72/0406; H04B 7/0617; H04B 7/0695; H04L 5/0048
See application file for complete search history.

(56) References Cited

U.S. PATENT DOCUMENTS

| 2015/0085838 A1 | 3/2015 | Benjebbour et al. |
| 2015/0092676 A1 | 4/2015 | Periyalwar et al. |

(Continued)

FOREIGN PATENT DOCUMENTS

| CN | 107852624    | 3/2018 |
| JP | 2015041857 A | 3/2015 |

(Continued)

OTHER PUBLICATIONS

"International Application Serial No. PCT US2015 061486, International Preliminary Report on Patentability dated Feb. 8, 2018", 7 pgs.

(Continued)

*Primary Examiner* — Jung H Park
(74) *Attorney, Agent, or Firm* — Kowert, Hood, Munyon, Rankin & Goetzel, P.C.

(57) ABSTRACT

Embodiments of a User Equipment (UE), an Evolved Node-B (eNB), small-cell access point (AP), and methods for dynamic millimeter wave pencil cell communication are generally described herein. The UE may receive access point reference signals (APRS) from one or more small-cell access points (AP), and may transmit APRS signal quality measurements to a macro-cell Evolved Node-B (eNB). The UE may receive, from the macro-cell eNB, a message that indicates candidate pencil cells for which the UE is to determine signal quality measurements, the candidate pencil cells supported by the small-cell APs. The UE may receive beam reference signals (BRS) for the candidate pencil cells and may refrain from reception of BRS for pencil cells not (Continued)

included in the message. In some cases, beam-widths of the APRSs may be larger than beam-widths of the BRSs.

30 Claims, 9 Drawing Sheets

(51) Int. Cl.
*H04W 16/32* (2009.01)
*H04W 36/00* (2009.01)
*H04W 84/04* (2009.01)
*H04B 17/309* (2015.01)

(52) U.S. Cl.
CPC ....... *H04W 36/0083* (2013.01); *H04B 17/309* (2015.01); *H04W 84/045* (2013.01)

(56) References Cited

U.S. PATENT DOCUMENTS

| | | | |
|---|---|---|---|
| 2017/0006593 A1* | 1/2017 | Liu | H04W 16/32 |
| 2017/0251444 A1* | 8/2017 | Huang | H04W 16/28 |
| 2019/0104549 A1* | 4/2019 | Deng | H04B 7/0617 |

FOREIGN PATENT DOCUMENTS

| | | |
|---|---|---|
| WO | WO-2014182131 A1 | 11/2014 |
| WO | 2015109153 | 7/2015 |
| WO | WO-2015108391 A1 | 7/2015 |

OTHER PUBLICATIONS

"International Application Serial No. PCT/US2015/061486, International Search Report dated Apr. 26, 2016", 3 pgs.

"International Application Serial No. PCT/US2015/061486, Written Opinion dated Apr. 26, 2016", 5 pgs.

Soon-Gi, Park, "Novel Cellular System Design using Standalone and Centralized mmWave-based Multi-Spot Beam Structure", International Journal of Control and Automation, vol. 8, No. 2, (2015), 337-350 pgs.

"European Application Serial No. 15899905.2, Extended European Search Report dated Feb. 21, 2019", 8 pgs.

"European Application Serial No. 15899905.2, Response filed Sep. 23, 2019 to Extended European Search Report dated Feb. 21, 2019", 28 pgs.

* cited by examiner

USER EQUIPMENT (UE) AND METHODS FOR DYNAMIC MILLIMETER WAVE PENCIL CELL COMMUNICATION

PRIORITY CLAIM

This application claims is a U.S. National Stage Filing under 35 U.S.C. 371 from International Application No. PCT/US2015/061486, filed Nov. 19, 2015 and published in English as WO 2017/019116 on Feb. 2, 2017, which priority to U.S. Provisional Patent Application Ser. No. 62/198,247, filed Jul. 29, 2015, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments related to Wireless Gigabit Alliance (WiGIG) networks. Some embodiments relate to Fifth Generation (5G) networks. Some embodiments relate to communication using pencil cells, small cells and/or macro cells. Some embodiments relate to millimeter wave (mmW) communication.

BACKGROUND

A mobile network may support communication with mobile devices. In some cases, small cells may be deployed within a macro cell to provide localized communication to the mobile devices. For instance, when a large number of people are gathered at a particular location and/or event, demand for data communication and/or other communication may increase. The usage of small cells may alleviate the increased demand to some extent, although the mobile network may still become overloaded in some cases. Accordingly, there is a general need for methods and systems for enabling communication between the mobile devices and the network in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
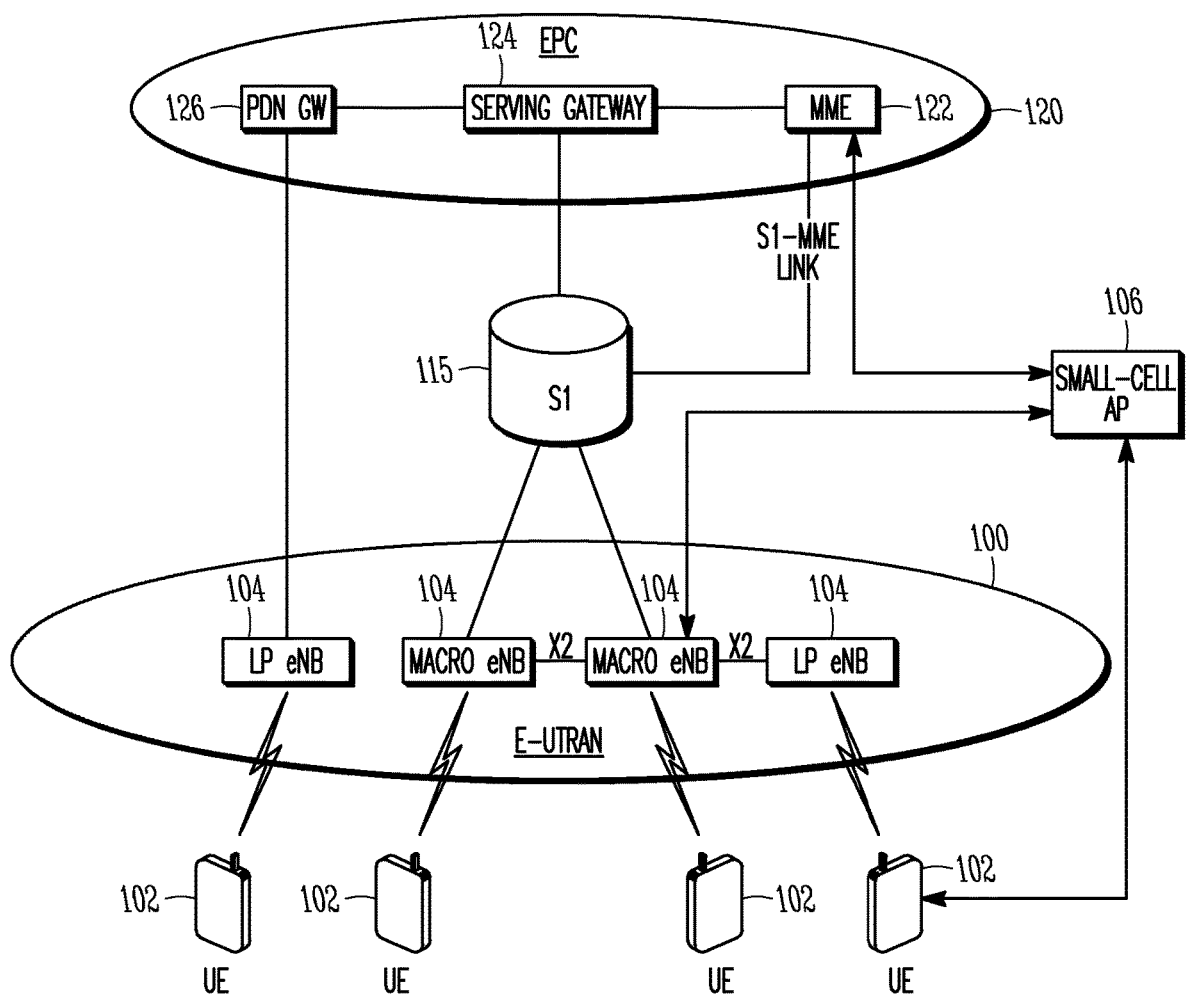
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, the eNB 104, the MME 122 and/or other component in the network may be communicatively coupled to one or more small-cell access points (AP) 106. The small-cell AP 106 may communicate with the UE 102 using techniques such as those described herein, although embodiments are not limited as such. As an example, the eNB 104, the MME 122 and/or other component may provide the small-cell AP 106 with various configuration information related to communication between the UE 102 and the small-cell AP 106. For instance, the communication between the small-cell AP 106 and the UE 102 may include exchanging of data using pencil-cell techniques in which a signal from the small-cell AP 106 may be transmitted in a directional manner and may be transmitted with a relatively high gain. The UE 102 may also receive various reference signals from the small-cell AP 106. The UE 102 and eNB 104 may exchange various control messages that may be related to measurements for such reception, in some cases. These embodiments will be described in more detail below.

It should be pointed out that embodiments are not limited to the usage of the example 3GPP network shown in FIG. 1, as other macro-cell networks may be used in some cases. Accordingly, the small-cell AP 106 (or other small-cell base station component) may be arranged to perform some or all of the techniques and operations described herein as part of embodiments that may include any suitable macro-cell network.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
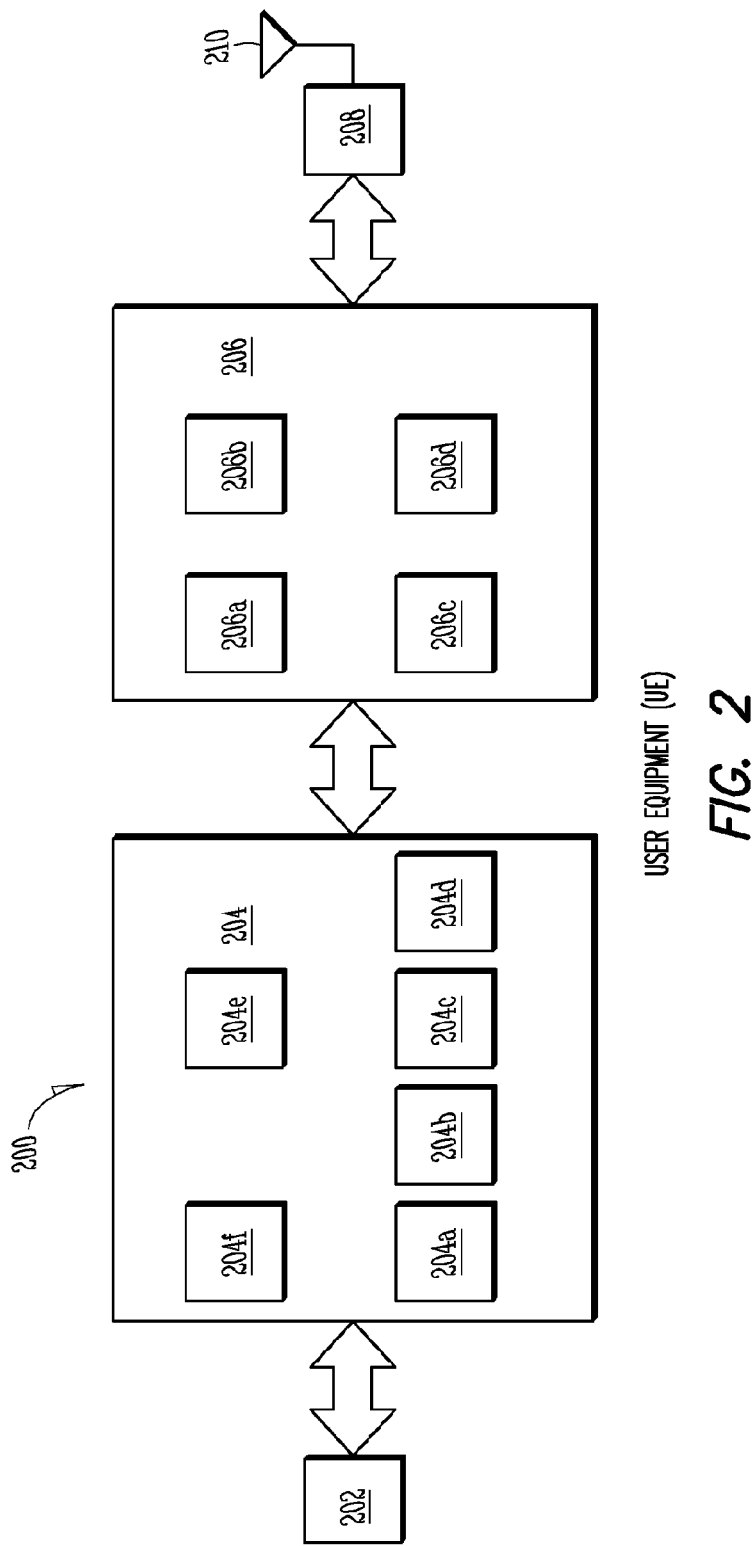
FIG. 2 is a block diagram of a User Equipment (UE) in accordance with some embodiments.

FIG. 2 is a block diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and one or more antennas 210, coupled together at least as shown. In some embodiments, other circuitry or arrangements may include one or more elements and/or components of the application circuitry 202, the baseband circuitry 204, the RF circuitry 206 and/or the FEM circuitry 208, and may also include other elements and/or components in some cases. As an example, "processing circuitry" may include one or more elements and/or components, some or all of which may be included in the application circuitry 202 and/or the baseband circuitry 204. As another example, "transceiver circuitry" may include one or more elements and/or components, some or all of which may be included in the RF circuitry 206 and/or the FEM circuitry 208. These examples are not limiting, however, as the processing circuitry and/or the transceiver circuitry may also include other elements and/or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, and/or input/output (I/O) interface.

Figure 3:
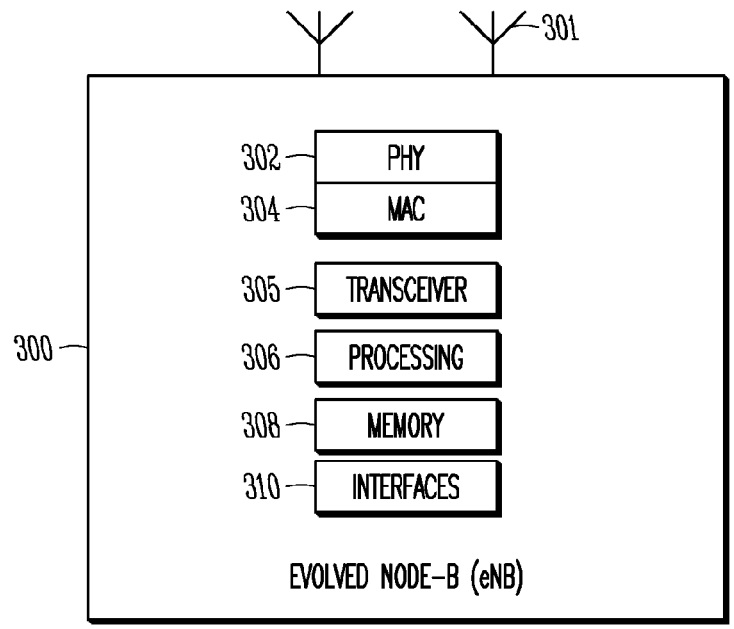
FIG. 3 is a block diagram of an Evolved Node-B (eNB) in accordance with some embodiments.

FIG. 3 is a block diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), the small-cell AP 106, components in the EPC 120 (FIG. 1) or other network components. In addition, the interfaces 310 may enable communication with other components that may not be shown in FIG. 1, including components external to the network. The interfaces 310 may be wired or wireless or a combination thereof.

Figure 4:
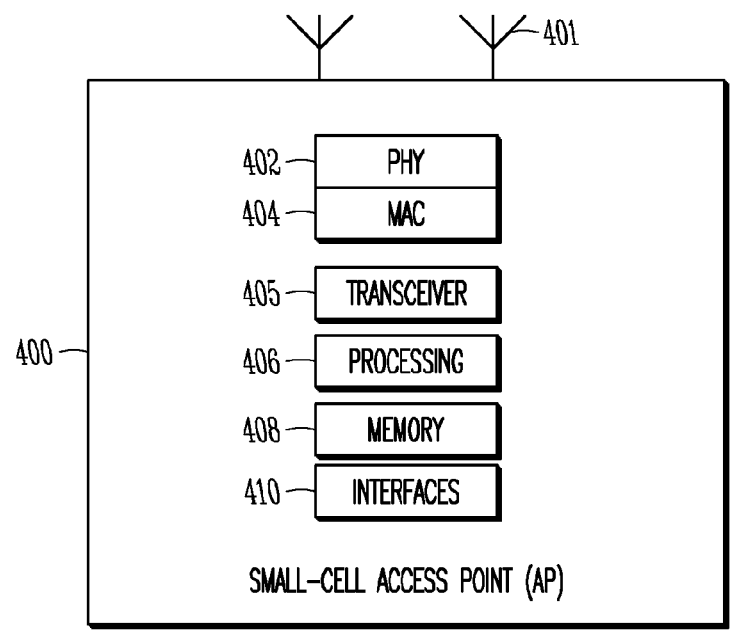
FIG. 4 is a block diagram of a small-cell access point (AP) in accordance with some embodiments.

FIG. 4 is a block diagram of a small-cell access point (AP) in accordance with some embodiments. The small-cell AP 400 may include physical layer circuitry 402 and a transceiver 405, one or both of which may enable transmission and reception of signals to and from the UE 200, eNB 300, other eNBs, other UEs or other devices using one or more antennas 401. As an example, the physical layer circuitry 402 may perform various encoding and decoding functions that may include formation of baseband signals for transmission and decoding of received signals. As another example, the transceiver 405 may perform various transmission and reception functions such as conversion of signals between a baseband range and a Radio Frequency (RF) range. Accordingly, the physical layer circuitry 402 and the transceiver 405 may be separate components or may be part of a combined component. In addition, some of the described functionality related to transmission and reception of signals may be performed by a combination that may include one, any or all of the physical layer circuitry 402, the transceiver 405, and other components or layers. The small-cell AP 400 may also include medium access control layer (MAC) circuitry 404 for controlling access to the wireless medium. The small-cell AP 400 may also include processing circuitry 406 and memory 408 arranged to perform the operations described herein. The small-cell AP 400 may also include one or more interfaces 410, which may enable communication with other components, including the eNB 104 (FIG. 1), components in the EPC 120 (FIG. 1) or other network components. In addition, the interfaces 410 may enable communication with other components that may not be shown in FIG. 1, including components external to the network. The interfaces 410 may be wired or wireless or a combination thereof.

The antennas 210, 301, 401 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210, 301, 401 may be effectively separated to take advantage of spatial diversity and the different channel characteristics that may result.

In some embodiments, the UE 200 and/or the eNB 300 and/or the small-cell AP 400 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 and/or eNB 300 and/or small-cell AP 400 may be configured to operate in accordance with 3GPP standards, although the scope of the embodiments is not limited in this respect. In some embodiments, the UE 200 and/or eNB 300 and/or small-cell AP 400 may be configured to operate in accordance with one or more IEEE 802.11 standards and/or wireless local area network (WLAN) standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300, small-cell AP 400 or other device may include one or more of a keyboard, a display, a non-volatile memory port, multiple antennas, a graphics processor, an application processor, speakers, and other mobile device elements. The display may be an LCD screen including a touch screen.

Although the UE 200, the eNB 300, and the small-cell AP 400 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 and/or eNB 300 and/or small-cell AP 400 may include various components of the UE 200 and/or the eNB 300 and/or the small-cell AP 400 as shown in FIGS. 2-4. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB. In addition, techniques and operations described herein that refer to the small-cell AP 400 (or 106) may be applicable to an apparatus for a small-cell AP.

In accordance with some embodiments, the UE 102 may receive access point reference signals (APRS) from one or more small-cell APs 106, and may transmit APRS signal quality measurements to a macro-cell eNB 104. The UE 102 may receive, from the macro-cell eNB 104, a message that indicates candidate pencil cells for which the UE 102 is to determine signal quality measurements, the candidate pencil cells supported by the small-cell APs 106. The UE 102 may receive, from the small-cell APs 106, beam reference signals (BRS) for the candidate pencil cells and may refrain from reception of BRS for pencil cells not included in the message. In some cases, beam-widths of the APRSs may be larger than beam-widths of the BRSs. These embodiments are described in more detail below.

Figure 5:
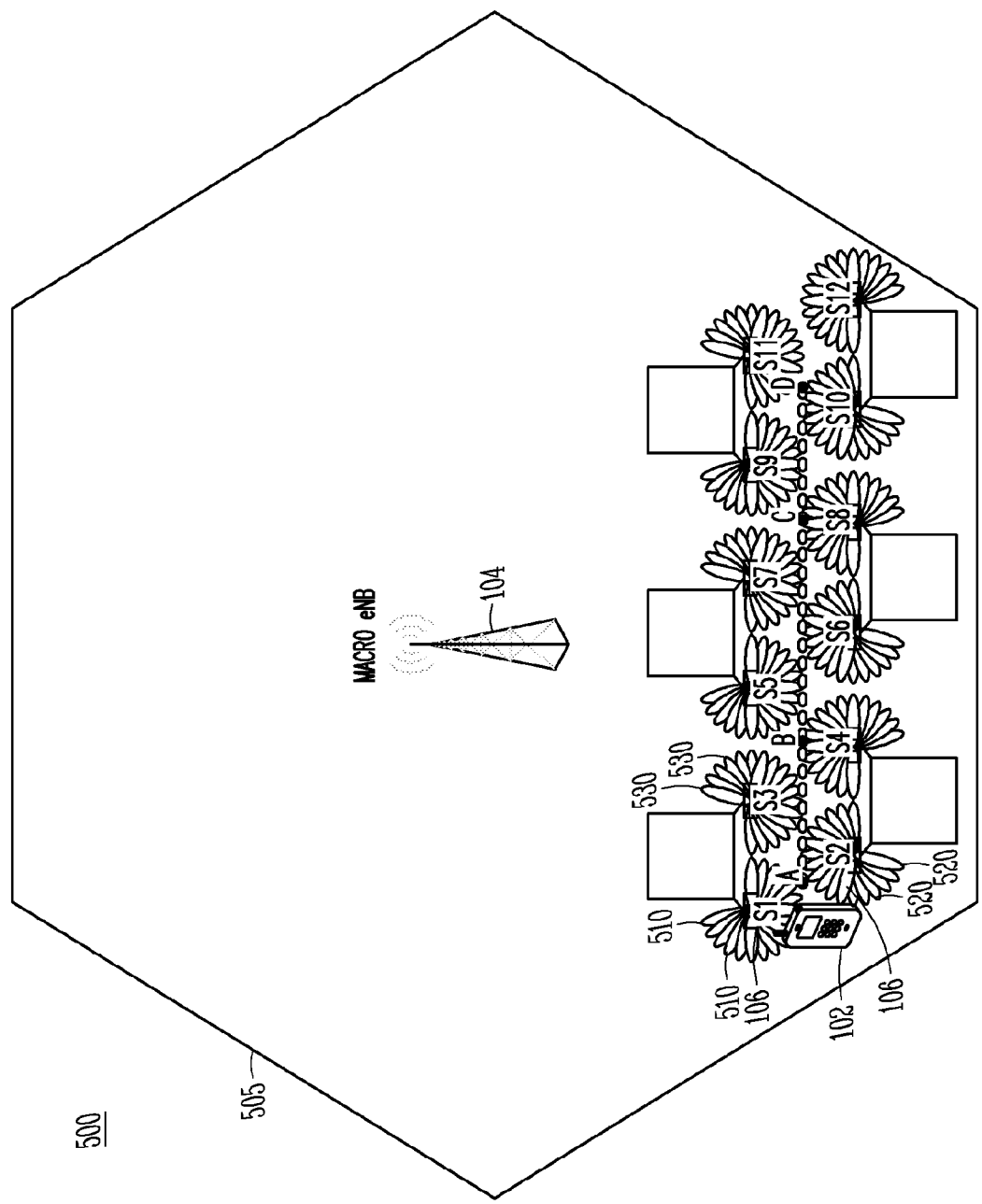
FIG. 5 illustrates an example of a scenario in which a UE may be in communication with a macro-cell eNB and with multiple small-cell APs in accordance with some embodiments.

FIG. 5 illustrates an example of a scenario in which a UE may be in communication with a macro-cell eNB and with multiple small-cell APs in accordance with some embodiments. Although the example scenario 500 shown in FIG. 5 may illustrate some or all aspects of techniques disclosed herein, it is understood that embodiments are not limited by this example scenario 500. It should also be noted that embodiments are not limited to the components shown in the example scenario 500. Embodiments are also not limited to the number of components shown or to the arrangement of the components as shown in FIG. 5. As an example, embodiments are not limited to usage of the UE 102, as other mobile devices may be used in some cases. For instance, a station (STA) arranged to communicate using a wireless local area network (WLAN) protocol (or other protocol) may be used. As another example, embodiments are not limited to usage of the eNB 104 (or macro-cell eNB 104 as shown), as other base station devices may be used in some cases. As another example, embodiments are not limited to the usage of the small-cell APs 106, as other base station components or other components may be used in some cases.

In the example scenario 500, the UE 102 may exchange packets, signals and/or messages with the eNB 104 using any suitable communication protocol, which may or may not be included as part of one or more standards. As a non-limiting example, the UE 102 may be arranged to communicate with the eNB 104 using a Third Generation Partnership Protocol (3GPP) Long Term Evolution (LTE) protocol in some cases. The UE 102 may also exchange packets, signals and/or messages with the small-cell APs 106 using any suitable communication protocol, which may or may not be the same protocol used for communication with the eNB 104. For instance, the UE 102 may be arranged to communicate with the small-cell APs 106 using a Fifth Generation (5G) protocol and/or an IEEE 802.11 protocol in some cases.

In addition, in the example scenario 500, the small-cell APs 106 may communicate with the eNB 104 and/or other network components using any suitable links and/or interfaces, which may be wireless or wired or a combination thereof. As an example, back-end communication between the small-cell APs 106 and the MME 122 and/or eNB 104 may be used. For instance, the small-cell APs 106 may be informed of configuration information related to communication between the small-cell APs 106 and the UEs 102.

In the example scenario 500, the eNB 104 may be configured to operate as a macro-cell eNB 104 (or macro eNB 104) in some cases. Accordingly, a coverage area 505 of the eNB 104 may comprise or overlap one or more coverage areas of small-cell APs 106. As a non-limiting example, the small-cell APs 106 may be installed on buildings. As shown in FIG. 5, the UE 102 may physically move along a path that may include points A-D. The first small-cell AP 106 labeled "S1" may support transmission according to multiple pencil cells such as those labeled 510. The second small-cell AP 106 labeled "S2" may support transmission according to multiple pencil cells such as those labeled 520. In a similar manner, the other small-cell APs 106 labeled S3-S12 may support transmission according to multiple pencil cells as shown.

When the UE 102 is located at point A, the UE 102 may be in coverage of small-cell APs S1 and/or S2. Accordingly, one or more of the pencil cells 510 and/or 520 may be able to provide directional, narrow-beam, high-gain coverage to the UE 102 based on the physical layout of the small-cell APs S1 and/or S2, the location of the UE 102 and/or other factors such as obstacles in the environment or other factors. Similarly, point B may be in coverage of small-cell APs S3, S4 and/or S5, point C may be in coverage of small-cell APs S7, S8 and/or S9, and point D may be in coverage of small-cell APs S10 and/or S11. Accordingly, the optimal set of pencil cells and/or small-cell APs 106 for the UE 102 may vary with movement of the UE 102.

It should also be pointed out that coordinated multi-point transmission (CoMP) techniques and/or multi-connectivity techniques may be used in some embodiments. As an example, signals may be transmitted to the UE 102 from one or more small-cell APs 106 and/or pencil cells in a manner which enables diversity gain at the UE 102. For instance, the same data packet may be transmitted from two or more different pencil cells for reception at the UE 102, which may use diversity combining or other techniques to receive the multiple copies of the data packet.

As a non-limiting example, in scenarios such as 500 and/or others, millimeter wave (mmW) small cells may be deployed in the coverage of a macro cell operating at below 6 GHz. Such operation may be applicable for a heterogeneous network structure for future 5G mobile systems and/or other systems. The usage of pencil beams with relatively narrow beam-widths (such as 5 to 15 degrees, for instance) and relatively high antenna gains and/or beamforming gains may be used by mmW small-cell APs 106 to achieve link budget target and energy efficient communication, in some cases. Each pencil beam may be viewed as a pencil cell which can be detected by a dedicated signature signal sequence for the pencil cell. In an environment with ultra-densely deployed mmW small cells, for instance, it may be possible or likely that the UE 102 may be reached by multiple pencil beams experiencing possibly different path losses. The beams may originate from one or more mmW small-cell APs 106. In some cases, in order to establish reliable, energy efficient and/or high data rate communication path between a mmW UE 102 and a radio access network (RAN), it may be beneficial to select and allocate a set of optimal pencil beams to serve the UE 102. Due to the mobility of mmW UEs 102 and variation of surrounding environment, it is possible that the set of optimal pencil beams may vary according to the dynamics of the propagation channels between the UE 102 and small-cell APs 106. As a result, components of the RAN, such as the macro-cell eNB 104, may track such dynamics so as to provide a consistent high data rate service to the UE 102.

Figure 6:
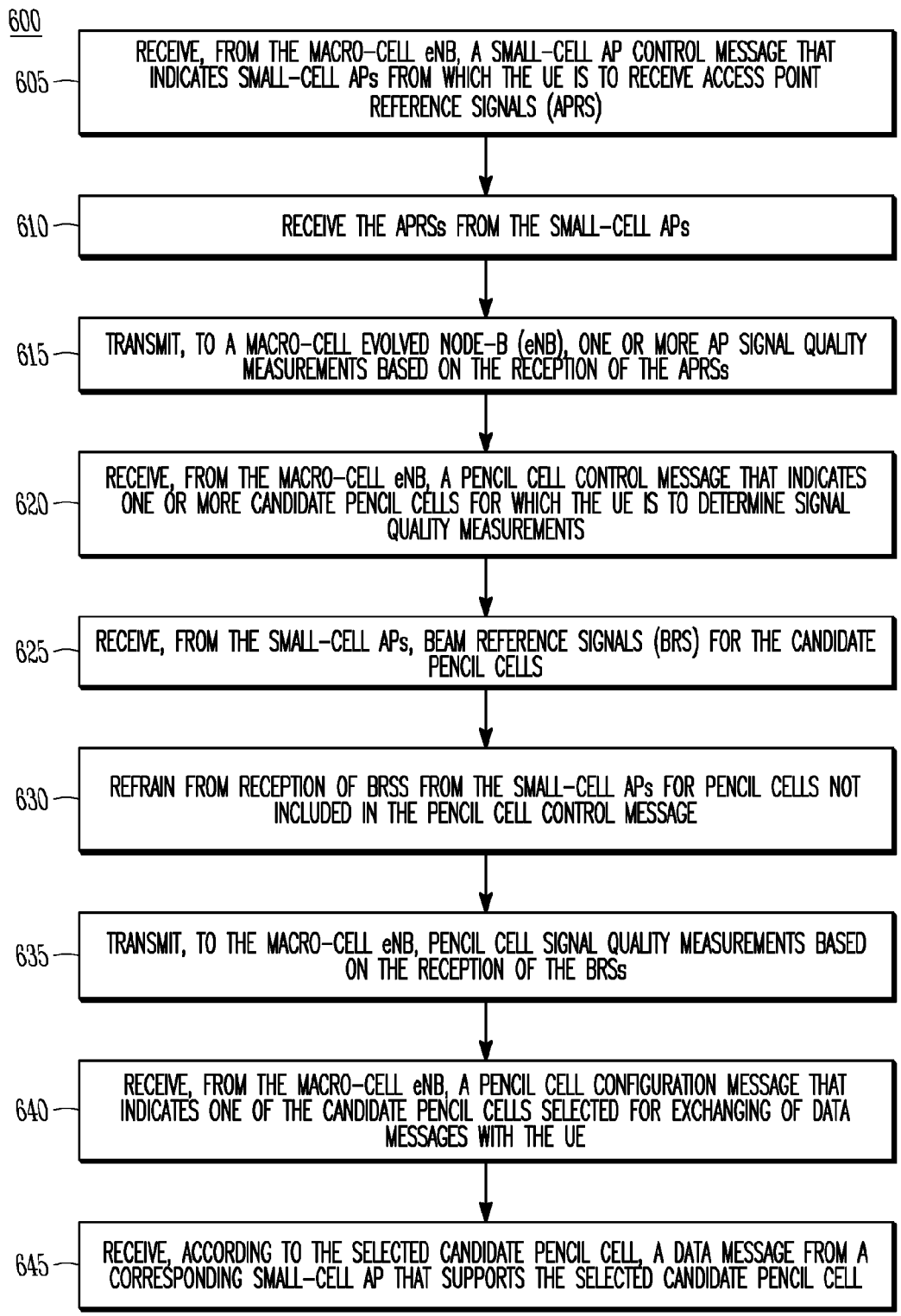
FIG. 6 illustrates the operation of a method of communication in accordance with some embodiments.

FIG. 6 illustrates the operation of a method of communication in accordance with some embodiments. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5 and 7-11, although it is understood that the method 600 may be practiced with any other suitable systems, interfaces and components.

In addition, while the method 600 and other methods described herein may refer to eNBs 104 or UEs 102 operating in accordance with 3GPP or other standards, embodiments of those methods are not limited to just those eNBs 104 or UEs 102 and may also be practiced on other devices, such as a Wi-Fi access point (AP) or user station (STA). The method 600 and other methods described herein may also refer to small-cell APs 106 (or other APs 106) that may operate in accordance with one or more IEEE 802.11 standards, WiGIG standards, 5G standards or other standards, but embodiments of those methods are not limited to usage of APs 106 and/or operation according to those standards. For instance, other base station components may be configured to operate as small-cell base stations in some cases.

In addition, the method 600 and other methods described herein may be practiced by wireless devices configured to operate in other suitable types of wireless communication systems, including systems configured to operate according to various IEEE standards such as IEEE 802.11. The method 600 may also refer to an apparatus for a UE 102 and/or eNB 104 and/or small-cell AP 106 and/or other device described above.

At operation 605 of the method 600, a UE 102 may receive, from a macro-cell eNB 104, one or more small-cell AP control messages. In some embodiments, the small-cell AP control messages may indicate one or more small-cell APs 106 from which the UE 102 is to receive one or more access point reference signals (APRS). As an example, the small-cell AP control messages may include information related to the APRS and/or the small-cell APs 106. Such information may include, but is not limited to, signature sequences for the APRSs, identifiers of the small-cell APs 106 from which the APRSs are to be received, channel resources to be used for the reception, timing in which the APRSs are to be received and/or other suitable information. In some embodiments, the small-cell AP control messages may include a "small-cell search request" that may request that the UE 102 determine small-cell signal quality measurements based on reception of the APRSs.

In addition, it should be noted that embodiments are not limited to the usage of small-cell AP control messages, as other control messages and/or other messages may be used for communication of such information related to the APRS and/or the small-cell APs 106. For instance, such information may be included in other messages that may or may not be dedicated for communication of the information.

In some embodiments, the eNB 104 may be configured to operate as a macro-cell eNB 104. As an example, a coverage area of the macro-cell eNB 104 may be larger than a combined coverage area that comprises coverage areas of the small-cell APs 106. That is, the coverage areas of the small-cell APs 106 may be a sub-region of the coverage area of the macro-cell eNB 104. This example is not limiting, however. In some cases, one or more of the small-cell coverage areas (or portions of them) may not necessarily be included in the macro-cell coverage area.

At operation 610, the UE 102 may receive one or more APRSs from one or more small-cell APs 106. In some embodiments, the APRSs may be received from small-cell APs 106 indicated in the small-cell AP control messages described previously, although embodiments are not limited as such.

It should be noted that in some embodiments, signals such as the small-cell AP control messages and/or others may be received from the eNB 104 in first channel resources that may be different from and/or exclusive to second channel resources in which other signals (such as the APRSs) are received from the small-cell APs 106. As a non-limiting example, the first and second channel resources may both be located at centimeter wave (cmW) frequencies, which may be different in some cases. As another non-limiting example, frequency bands used for communication with the eNB 104 and for communication with the small-cell APs 106 may be non-overlapping in some cases.

As an example, the APRSs may be transmitted by the small-cell APs 106 in an omni-directional manner. As another example, a beam-width of 120, 90 or 45 degrees may be used. These examples are not limiting, however, as other suitable beam-widths may be used for the transmission of the APRS.

At operation 615, the UE 102 may transmit, to the eNB 104, one or more AP signal quality measurements. In some embodiments, the measurements may be based on the reception of APRSs at the UE 102. For instance, the UE 102 may receive the APRSs and may perform the measurements, in some cases. The AP signal quality measurements may include any suitable measurements such as received signal strength indicator (RSSI), reference signal received power (RSRP), reference signal received quality (RSRQ), signal-to-noise ratio (SNR), signal-to-interference-plus-noise ratio (SINR) and/or any suitable measurement related to the received APRS. Such measurements may be included in one or more standards, in some cases, although embodiments are not so limited. The AP signal quality measurements may be transmitted in one or more control messages or other messages, which may or may not be dedicated for such purposes.

In some embodiments, the AP signal quality measurements may enable the eNB 104 to determine which small-cell APs 106 may be in the vicinity of the UE 102 and/or which small-cell APs 106 may have a strong wireless link with the UE 102.

At operation 620, the UE 102 may receive, from the eNB 104, one or more pencil cell control messages that may indicate one or more candidate pencil cells for which the UE 102 is to determine signal quality measurements. At operation 625, the UE 102 may receive, from the small-cell APs 106, beam reference signals (BRS) for the candidate pencil cells. At operation 630, the UE 102 may refrain from reception of BRSs from the small-cell APs 106 for pencil cells not included in the pencil cell control message. In some cases, the UE 102 may refrain from reception of BRSs from the small-cell APs 106 for pencil cells excluded from the pencil cell control message. In some embodiments, the pencil cell control messages may include a "pencil cell search request" that may request that the UE 102 determine pencil cell signal quality measurements based on reception of the BRSs.

It should be noted that the indication of which candidate pencil cells and/or BRSs that the UE 102 is to receive may enable the UE 102 to perform measurements on a relatively small number (or a manageable number) of pencil cells. That is, the indicated candidate pencil cells may be a subset of a total number of pencil cells supported by the small-cell APs 102. In some cases, the UE 102 may benefit from not having to receive BRSs and perform measurements on the total number of pencil cells.

In some embodiments, the pencil cell control messages may include information related to the BRS and/or the pencil cells and/or the small-cell APs 106. Such information may include, but is not limited to, signature sequences for the BRSs, identifiers of the pencil cells and/or small-cell APs 106 from which the BRSs are to be received, channel resources to be used for the reception, timing in which the BRSs are to be received and/or other suitable information. In addition, it should be noted that embodiments are not limited to the usage of pencil cell control messages, as other control messages and/or other messages may be used for communication of such information. For instance, such information may be included in other messages that may or may not be dedicated for communication of the information.

As described herein, a small-cell AP 106 may support multiple pencil cells in some cases. In some embodiments, a coverage area of the APRS for the small-cell AP 106 may be larger than a combined coverage area that comprises coverage areas of BRSs for multiple pencil cells supported by the small-cell AP 106. As a non-limiting example, a portion of the coverage area of the APRS (which may be referred to as "small-cell coverage" in some cases) may be divided into smaller cells that may be used by the small-cell AP 106 for directional high-gain communication with the UE 102 in a relatively small and/or narrow area. That is, one or more coverage areas of the pencil cells may be sub-regions of the coverage area of the small-cell AP 106. This example is not limiting, however. In some cases, one or more of the pencil cell coverage areas (or portions of them) may not necessarily be included in the coverage area of the small-cell AP 106.

Accordingly, a relatively narrow beam-width may be used by the small-cell AP 106 for transmission according to a pencil cell. That is, directional transmission using beam-forming techniques and/or other techniques may be used for transmission according to the pencil cell. For instance, a beam-width used for transmission according to a pencil cell may be more narrow than a beam-width used for transmission of the APRS. As a non-limiting example, the beam-width for the APRS may be at least 90 degrees and the beam-width for the pencil cells may be at most 15 degrees. As another non-limiting example, the beam-widths for the pencil cells may be included in a range of 5 to 15 degrees. As another non-limiting example, the APRS may be transmitted in an omni-directional manner.

In addition, a beam-forming gain and/or other gain may be applied to the transmission according to the pencil cells. As a non-limiting example, the transmission of the BRS by the small-cell AP 106 may be performed using 10 dB of gain in comparison to the transmission of the APRS. Embodiments are not limited to the gain of 10 dB, however, as 5, 15, 20 dB or other suitable value may be used in some cases.

In some embodiments, at least one of the small-cell APs 106 may support multiple candidate pencil cells for which assigned BRSs are different. For instance, signature sequences upon which the BRSs are based may be different for different pencil cells. In some cases, such a difference may enable the UE 102 to identify which pencil cell is being used, by the small-cell AP 106, for transmission. It should also be noted that the pencil cell control message may indicate candidate pencil cells that may or may not be supported by the same small-cell AP 106. As an example, some of the candidate pencil cells may be supported by different small-cell APs 106. For instance, the UE 102 may be located on the edge of coverage between two small-cell APs 106, and the eNB 104 may identify one or more pencil cells from each of the two different small-cell APs 106 that may be candidates for usage by the UE 102. Referring to FIG. 5, when the UE 102 is located at point A, one or more pencil cells 510 supported by the "S1" small-cell AP 106 and one or more pencil cells 520 supported by the "S2" small-cell AP 106 may be candidate pencil cells for the UE 102. As another example, some or all of the candidate pencil cells may be supported by a same small-cell AP 106 in some cases.

At operation 635, the UE 102 may transmit, to the eNB 104, pencil cell signal quality measurements. In some embodiments, the measurements may be based on the reception of BRSs at the UE 102. For instance, the UE 102 may receive the BRSs and may perform the measurements, in some cases. The pencil cell signal quality measurements may include any suitable measurements such as received signal strength indicator (RSSI), reference signal received power (RSRP), reference signal received quality (RSRQ), signal-to-noise ratio (SNR), signal-to-interference-plus-noise ratio (SINR) and/or any suitable measurement related to the received APRS. Such measurements may be included in one or more standards, in some cases, although embodiments are not so limited. The pencil cell signal quality measurements may be transmitted in one or more control messages or other messages, which may or may not be dedicated for such purposes. In some embodiments, the pencil cell signal quality measurements may enable the eNB 104 to determine which pencil cells may be in the vicinity of the UE 102 and/or which small-cell APs 106 may have a strong wireless link with the UE 102.

At operation 640, the UE 102 may receive, from the eNB 104, one or more pencil cell configuration messages. In some embodiments, the messages may indicate a candidate pencil cell selected, by the eNB 104, for exchanging of data messages with the UE 102. At operation 645, the UE 102 may receive, according to the selected candidate pencil cell, a data message from a corresponding small-cell AP 106 that supports the selected candidate pencil cell. That is, the UE 102 may begin to receive data from the corresponding small-cell AP 106 according to the selected candidate pencil cell.

In some embodiments, the UE 102 may continue to perform measurements on APRS and/or BRS in order to monitor signal quality from the pencil cells and/or small-cell APs 106. As an example, the UE 102 may transmit such measurements (which may be updated measurements, in some cases) in a periodic manner according to a periodicity parameter. As another example, the UE 102 may transmit the measurements in a non-periodic manner. For instance, the eNB 104 may request the measurements in some cases. As another example, the eNB 104 may inform the UE 102 of a new group of candidate pencil cells for which the UE 102 is to perform measurements. As another example, the eNB 104 may indicate to the UE 102 to hand-off to another pencil cell. In some cases, the pencil cell to which the UE 102 is to hand-off may be included in the original group of candidate pencil cells (such as indicated in operation 620) and/or in the new group of candidate pencil cells, although embodiments are not limited as such. As another example, the eNB 104 may indicate a reconfiguration, by the UE 102, from the selected candidate pencil cell to a reconfigured candidate pencil cell for exchanging of data messages with the UE 102. The UE 102 may receive, according to the reconfigured candidate pencil cell, a data message from a corresponding small-cell AP that supports the reconfigured candidate pencil cell. It should be noted that embodiments are not limited to these example operations related to hand-off and/or reconfiguration, as other operations may be used in some cases, in addition to or instead of the operations just described.

In some embodiments, different channel resources may be used for different communication by the UE 102. As a non-limiting example, the UE 102 may exchange control messages with the eNB 104 using macro-cell channel resources located at a first centimeter wave (cmW) frequency. The UE 102 may receive APRSs from the small-cell APs 106 in small-cell channel resources at a second cmW frequency. The small-cell channel resources may be different from, exclusive to and/or non-overlapping with the macro-cell channel resources. The UE 102 may receive BRSs from the small-cell APs 106 according to the candidate pencil cells in pencil cell channel resources at a millimeter save (mmW) frequency. Accordingly, the pencil cell channel resources may be different from, exclusive to and/or non-overlapping with the macro-cell channel resources and the small-cell channel resources. In some cases, the UE 102 may receive data from a small-cell AP 106 according to a selected candidate pencil cell using channel resources at an mmW frequency, which may or may not be the same mmW frequency used for the reception of the BRSs.

It should be noted that various techniques and/or designs may enable transmission and/or reception of signals by the UE 102 in multiple frequency bands, in some cases. As an example, a group of one or more antennas may be used by the UE 102 to transmit and/or receive signals in different frequency bands. It is understood that additional components, such as diplexers or other components, may be included in some such arrangements. As another example, one or more antennas may be dedicated to each frequency band for transmission and/or reception. These examples are not limiting, however, as any suitable technique may be used to accommodate the usage of multiple frequency bands by the UE 102 in these and other scenarios.

Figure 7:
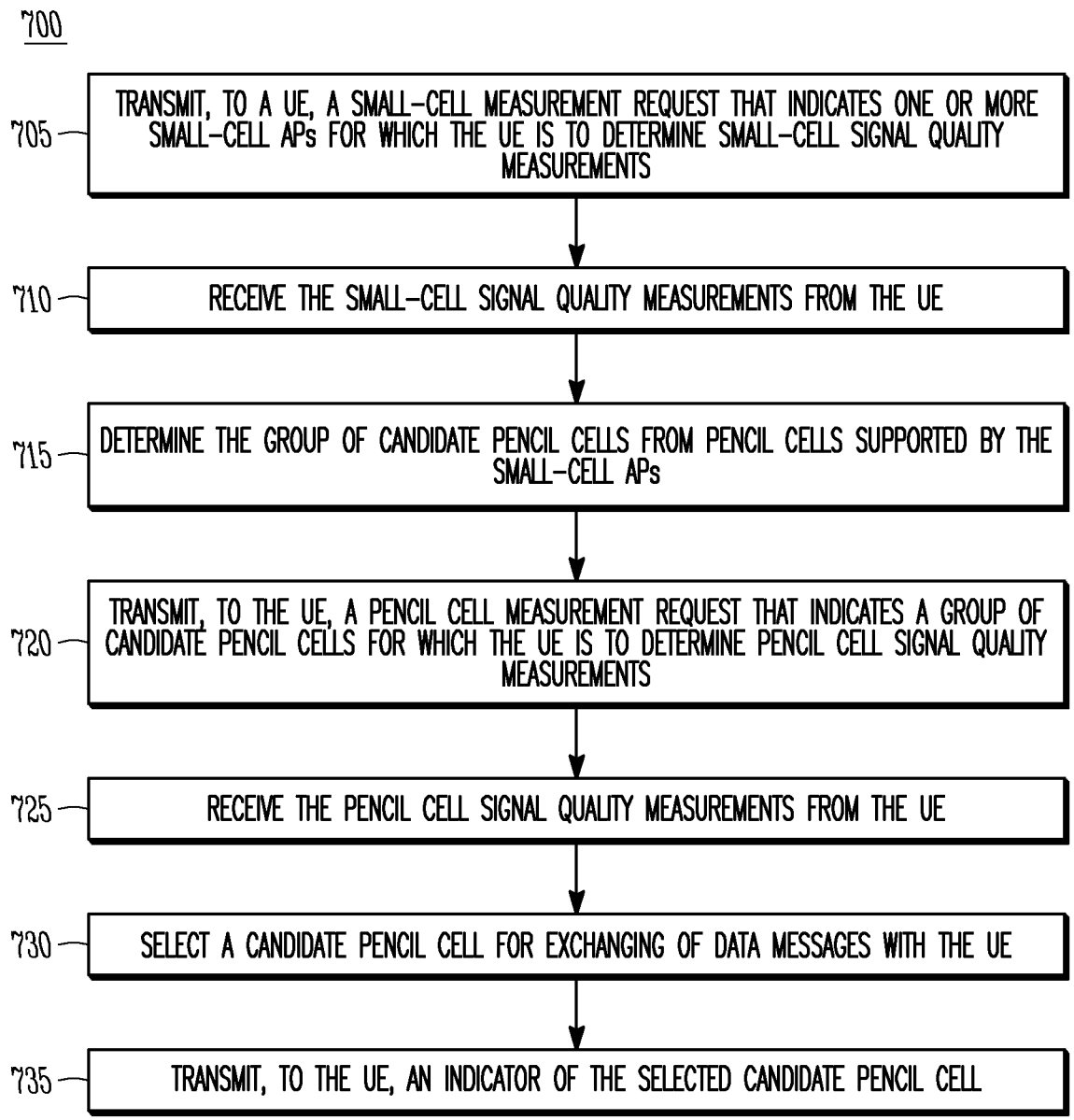
FIG. 7 illustrates another example of a method of communication in accordance with some embodiments.

FIG. 7 illustrates another example of a method of communication in accordance with some embodiments. As mentioned previously regarding the method 600, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6 and 8-11, although it is understood that the method 700 may be practiced with any other suitable systems, interfaces and components. In addition, embodiments of the method 700 may also be applicable to UEs 102, eNBs 104, small-cell APs 106, APs, STAs or other wireless or mobile devices. The method 700 may also refer to an apparatus for a small-cell AP 106, eNB 104 and/or UE 102 or other device described above.

It should be noted that the method 700 may be practiced at an eNB 104 and may include exchanging of signals or messages with a UE 102. Similarly, the method 600 may be practiced at a UE 102 and may include exchanging of signals or messages with an eNB 104. In some cases, operations and techniques described as part of the method 600 may be relevant to the method 700. In addition, embodiments may include operations performed at the eNB 104 that may be reciprocal or similar to other operations described herein performed at the UE 102. For instance, an operation of the method 700 may include transmission of a message by the eNB 104 while an operation of the method 600 may include reception of the same message or similar message by the UE 102.

In addition, previous discussion of various techniques and concepts may be applicable to the method 700 in some cases, including macro-cell arrangements and devices, small-cell arrangements and devices, pencil cell arrangements and devices, APRSs, BRSs, control messages, beamforming and others.

At operation 705, the eNB 104 may transmit, to a UE 102, a small-cell measurement request that indicates one or more small-cell APs 106 for which the UE 102 is to determine small-cell signal quality measurements. At operation 710, the eNB 104 may receive the small-cell signal quality measurements from the UE 102. Although embodiments are not limited as such, in some cases, previously described techniques for indicating the small-cell APs 106 may be used and previously described signal quality measurements may be used.

At operation 715, the eNB 104 may determine a group of candidate pencil cells for which the UE 102 is to determine pencil cell signal quality measurements. At operation 720, the eNB 104 may transmit, to the UE 102, a pencil cell measurement request that indicates the group of candidate pencil cells. The candidate pencil cells may be determined from pencil cells supported by the small-cell APs 106. In some embodiments, the eNB 104 may determine that the candidate pencil cells in the group may be possible candidates for usage by the UE 102 for pencil cell reception of data. As an example, the determination may be based at least partly on the received small-cell signal quality measurements. For instance, pencil cells of small-cell APs 106 with relatively strong small-cell signal quality measurements may be determined as candidates. As another example, the determination may be based on a geographic layout of the pencil cells and directional beam patterns of the pencil cells. For instance, such geographic information may be used, along with the small-cell signal quality measurements, in the determination of the candidate pencil cells.

At operation 725, the eNB 104 may receive pencil cell signal quality measurements from the UE 102. In some embodiments, the received pencil cell signal quality measurements may be for the candidate pencil cells indicated in the pencil cell measurement request. As a non-limiting example, previously described signal quality measurements may be used. The measurements may be received in one or more control messages or other messages from the UE 102, which may or may not be dedicated for communication of the signal quality measurements.

At operation 730, the eNB 104 may select a candidate pencil cell from the group of candidate pencil cells for usage by the UE 102. At operation 735, the eNB 104 may transmit an indicator of the selected candidate pencil cell to the UE 102. It should also be pointed out that the selected candidate pencil cell and/or related information may also be communicated to one or more of the small-cell APs 106 (such as the particular one that supports the selected candidate pencil cell) using techniques such as those previously described. For instance, the MME 122 and/or the eNB 104 may communicate such information through a back-haul and/or other interface.

As an example, the selection may be based at least partly on the pencil cell signal quality measurements. As another example, the selection may also be based at least partly on geographic information, such as the geographic layout information previously described. As another example, the selection may be further based at least partly on the small-cell signal quality measurements received at operation 710. Accordingly, any combination of such information may be used by the eNB 104 to select the pencil cell to be used by the UE 102 for reception of data. These examples are not limiting, however, as other information may be used in the selection, in addition to or instead of the information described in these examples.

As a non-limiting example, the measurement requests may be transmitted in macro-cell channel resources at a first centimeter wave (cmW) frequency. The small-cell signal quality measurements may be based on signals transmitted by the small-cell APs 106 in small-cell channel resources at a second cmW frequency. The pencil cell signal quality measurements may be based on directional signals transmitted by the small-cell APs 106 in pencil cell channel resources at a millimeter wave (mmW) frequency.

Figure 8:
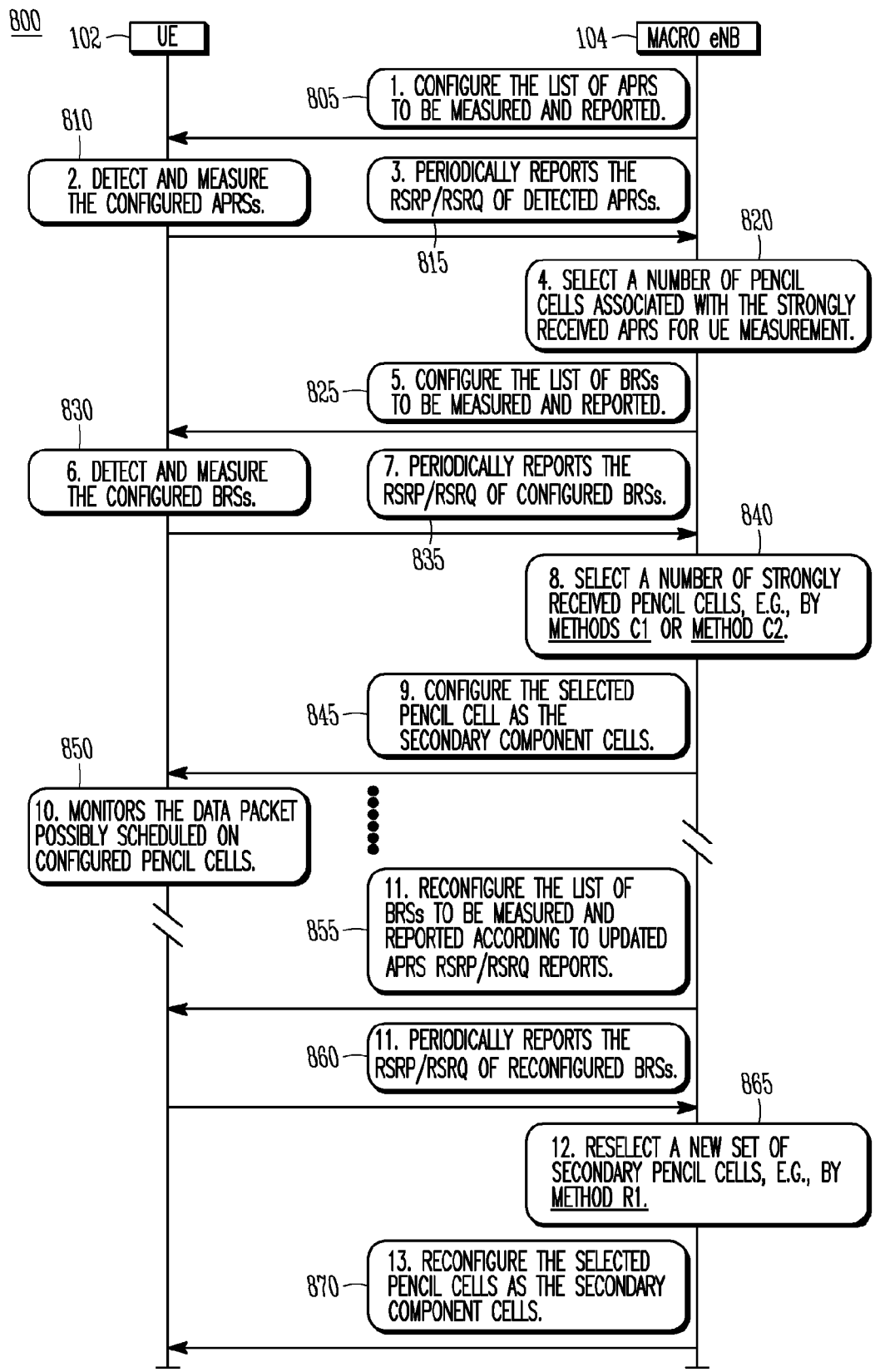
FIG. 8 illustrates an example of communication between a UE and a macro-cell eNB in accordance with some embodiments.

FIG. 8 illustrates an example of communication between a UE and a macro-cell eNB in accordance with some embodiments. It should be noted that embodiments are not limited by the example communication 800 shown in FIG. 8, in terms of the number, arrangement or type of components or messages. As an example, some embodiments may or may not include all messages and/or operations shown in the example communication 800 in FIG. 8. Some methods described herein may include some or all of these operations and/or similar operations, but embodiments are not limited as such. In addition, other mobile device components and/or base station components may be used in some cases. In some cases, previous discussion of various techniques and concepts may be applicable to the example communication 800, including macro-cell arrangements and devices, small-cell arrangements and devices, pencil cell arrangements and devices, APRSs, BRSs, control messages, beam-forming and others.

At operation 805, the eNB 104 may configure a list of APRSs to be measured and reported by the UE 102 and may communicate the list to the UE 102. The UE 102 may detect and measure the APRSs included in the list at operation 810, and may periodically report RSRP/RSRQ and/or other measurements for the APRSs to the eNB 104 at operation 815. At operation 820, the eNB 104 may select a number of pencil cells that may be associated with the strongly received APRSs for measurement by the UE 102. At operation 825, the eNB 104 may configure a list of BRSs to be measured and reported. The BRSs may be those BRSs assigned to the pencil cells determined at operation 820 in some cases. At operation 830, the UE 102 may detect and measure the indicated BRSs, and may periodically report RSRP/RSRQ and/or other measurements for the BRSs to the eNB 104 at operation 835. At operation 840, the eNB may select a number of strongly received pencil cells using any suitable technique, examples of which will be described below. At operation 845, the eNB 104 may configure the selected pencil cells as secondary component cells and may communicate such information to the UE 102. At operation 850, the UE 102 may monitor the configured pencil cells for data packets.

At operations 855-870, the eNB 104 and the UE 102 may perform similar operations to possibly select a new set of secondary pencil cells. For instance, in order to accommodate mobility of the UE 102, it may be beneficial or necessary that new pencil cells with different locations and/or directions be used in some cases.

Figure 9:
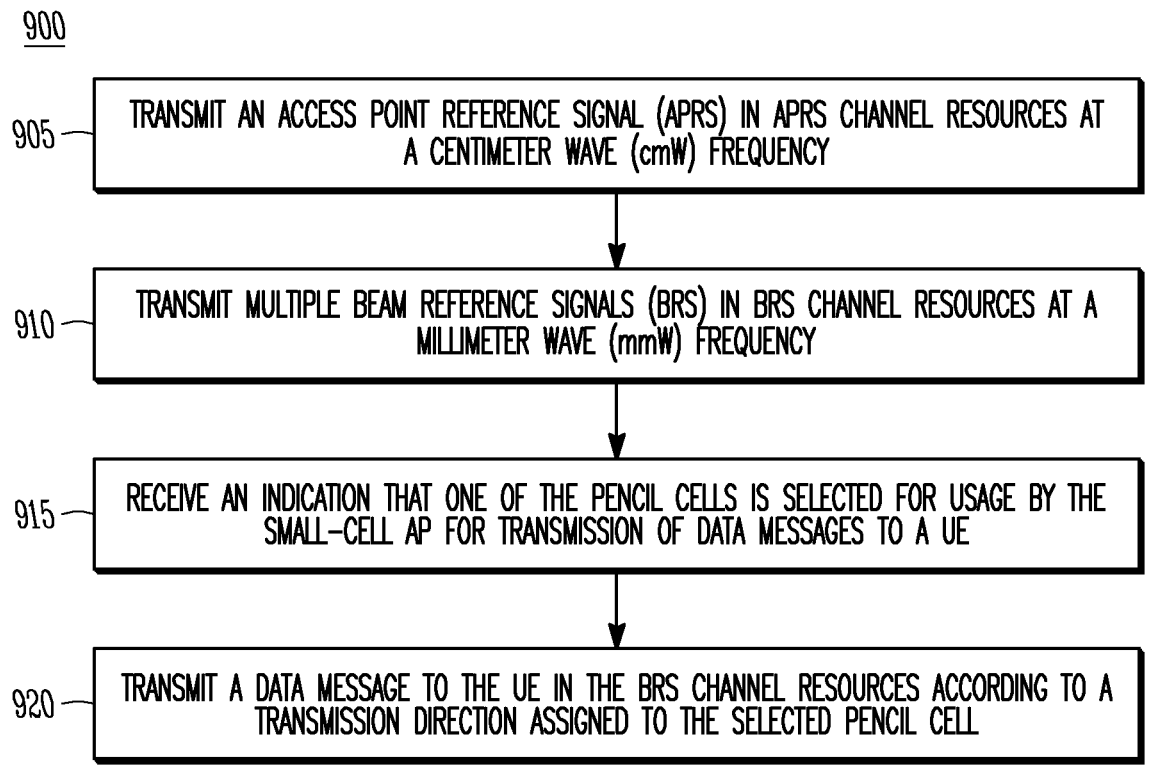
FIG. 9 illustrates another example of a method of communication in accordance with some embodiments.

FIG. 9 illustrates another example of a method of communication in accordance with some embodiments. As mentioned previously regarding the methods 600 and 700, embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-8 and 10-11, although it is understood that the method 900 may be practiced with any other suitable systems, interfaces and components. In addition, embodiments of the method 900 may also be applicable to UEs 102, eNBs 104, small-cell APs 106, APs, STAs or other wireless or mobile devices. The method 900 may also refer to an apparatus for a small-cell AP 106, eNB 104 and/or UE 102 or other device described above.

It should be noted that the method 900 may be practiced at a small-cell AP 106 and may include exchanging of signals or messages with a UE 102. Similarly, the method 600 may be practiced at a UE 102 and may include exchanging of signals or messages with a small-cell AP 106. In some cases, operations and techniques described as part of the method 600 may be relevant to the method 900. In addition, embodiments may include operations performed at the small-cell AP 106 that may be reciprocal or similar to other operations described herein performed at the UE 102. For instance, an operation of the method 900 may include transmission of a reference signal by the small-cell AP 106 while an operation of the method 600 may include reception of the same reference signal or similar reference signal by the UE 102.

In addition, previous discussion of various techniques and concepts may be applicable to the method 900 in some cases, including macro-cell arrangements and devices, small-cell arrangements and devices, pencil cell arrangements and devices, APRSs, BRSs, control messages, beam-forming and others.

At operation 905, the small-cell AP 106 may transmit an APRS in APRS channel resources. Although not limited as such, the APRS may be transmitted at a centimeter wave (cmW) frequency. At operation 910, the small-cell AP 106 may transmit multiple BRSs in BRS channel resources. Although not limited as such, the BRS may be transmitted at a millimeter wave (mmW) frequency. In some embodiments, the BRSs may be assigned to multiple directional pencil cells supported by the small-cell AP 106. Although embodiments are not limited as such, previously described specifications for the APRS and BRS (such as beam-widths) may be applicable in some cases.

At operation 915, the small-cell AP 106 may receive an indication that one of the pencil cells is selected for usage by the small-cell AP 106 for transmission of data messages to a UE 102. As an example, the MME 122, macro eNB 104 or other component may transmit such an indication to the small-cell AP 106 as previously described, although embodiments are not limited as such. At operation 920, the small-cell AP 106 may transmit one or more data messages to the UE 102. In some embodiments, the transmission may be performed according to a transmission direction assigned to the selected pencil cell, as previously described. As an example, the BRS channel resources used for the transmission of the BRSs may also be used for transmission of the data. This example is not limiting, however, as other channel resources may be used. The other channel resources may or may not overlap the BRS channel resources in some cases, and may or may not be performed at another mmW frequency in some cases.

In some embodiments, the data messages may include or may be based on the BRS for the selected pencil cell. For instance, a data message may include a data portion and may also include a control portion (such as a pilot portion or other) that may be based on the BRS.

Figure 10:
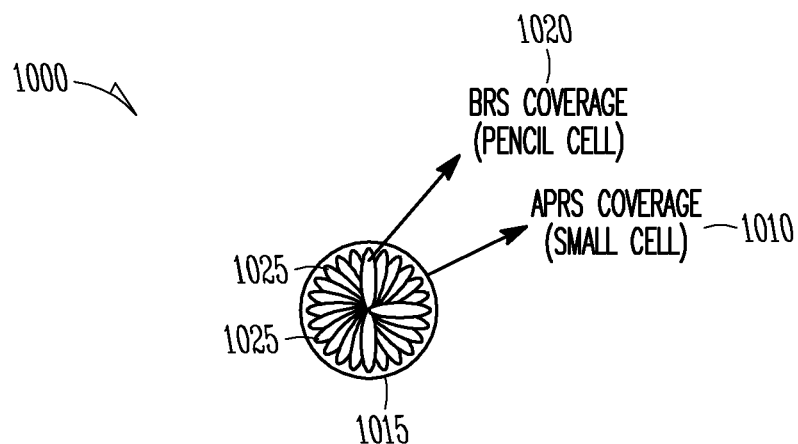
FIG. 10 illustrates example reference signals in accordance with some embodiments.

FIG. 10 illustrates example reference signals in accordance with some embodiments. The small-cell AP 1000 (which may be suitable for use as the small-cell AP 106 in some cases) may provide APRS coverage 1010 or small-cell coverage as indicated by the circular region 1015. As a non-limiting example, omni-directional transmission or transmission with a beam-width that is relatively wide (like 90 degrees or higher) may be used for the APRS coverage. The small-cell AP 1000 may also provide BRS coverage 1020 or pencil cell coverage as indicated by the oval shaped regions 1025. As a non-limiting example, narrow beam-widths may be used. For instance, a range of 5-15 degrees may be used for the pencil cells. As another non-limiting example, a coverage of the APRS transmitted by the small-cell AP 106 may be similar to an aggregated coverage of the pencil cells transmitted by the small-cell AP 106.

As an example of APRS transmission, the LTE cell-specific reference symbol (CRS) of port 0 may be used. As another example, an LTE discovery signal may be use. Accordingly, one or more synchronization signals and/or the CRS of port 0 may be used. As another example, a physical side-link discovery signal may be used. Accordingly, the small-cell AP 106 may be configured to operate as a device which can be discovered by the UE 102, such as when the UE 102 is in close proximity to the small-cell AP 106. It should be noted that embodiments are not limited by these examples, as other suitable techniques may be used for APRS transmission and/or APRS design. The CSI-RS may be included in 3GPP standards or other standards, although embodiments are not limited as such.

As an example of BRS transmission, a periodicity and/or time-frequency resources for the BRSs may be configured by the macro eNB 104. As another example, the BRS may reuse similar techniques used for LTE discovery signal. For instance, the BRS may include one or more beam-specific synchronization signals and/or channel state information reference symbols (CSI-RS). The CSI-RS may be included in 3GPP standards or other standards, although embodiments are not limited as such. As another example, different BRSs used for pencil cells of the same small-cell AP 106 may be transmitted with different periodicities. For instance, BRSs of pencil cells supporting more UEs 102 and/or more traffic may be transmitted more frequently than BRSs of pencil cells that support fewer UEs 102 and/or less traffic. As another example, some or all BRSs used by pencil cells of the same small-cell AP 106 may be transmitted simultaneously. For instance, the BRSs in such cases may be transmitted in a same OFDM symbol period and/or time transmission interval (TTI) or other time period. In such cases, the small-cell AP 106 may comprise multiple RF chains and/or multiple analog beam-formers to support the simultaneous transmission of multiple beams. As another example, multiple BRSs may be transmitted by a same RF chain at different times. It should be noted that embodiments are not limited by these examples, as other suitable techniques may be used for BRS transmission and/or BRS design.

Figure 11:
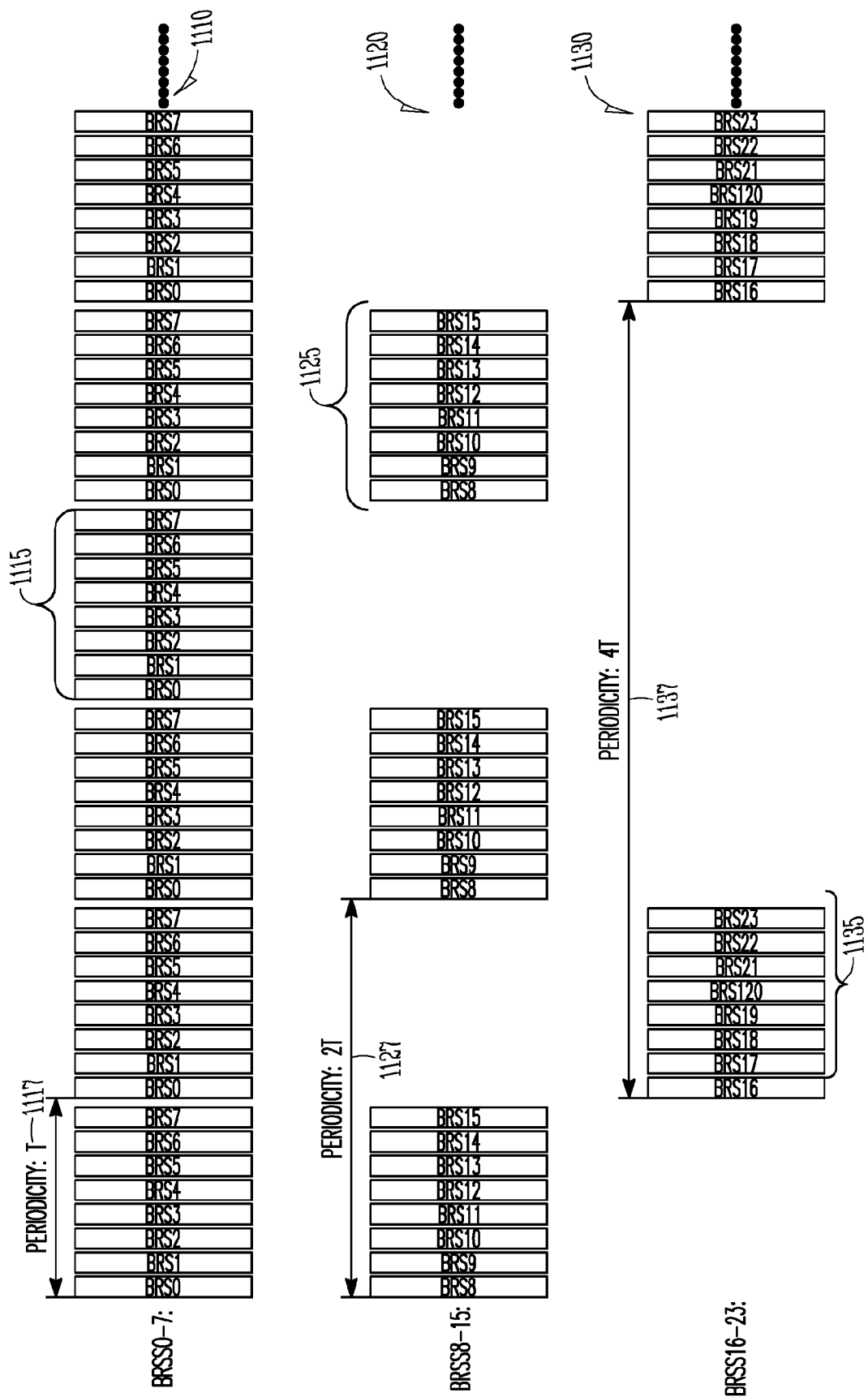
FIG. 11 illustrates an example of transmission of reference signals according to various periodicity parameters in accordance with some embodiments.

FIG. 11 illustrates an example of transmission of reference signals according to various periodicity parameters in accordance with some embodiments. In the first example 1110, BRSs for 8 pencil cells (labeled as BRSs 0-7) are transmitted according to a period of T. For instance, within the group of time intervals 1115, each of BRS0-BRS7 are transmitted. Additional groups similar to 1115 may be transmitted spaced apart by an interval of T, as indicated by 1117.

In the second example 1120, BRSs for 8 pencil cells (labeled as BRSs 8-15) are transmitted according to a period of 2T. For instance, within the group of time intervals 1125, each of BRS8-BRS15 are transmitted. Additional groups similar to 1125 may be transmitted spaced apart by an interval of 2T, as indicated by 1127. In the third example 1130, BRSs for 8 pencil cells (BRSs 16-23) are transmitted according to a period of 4T. For instance, within the group of time intervals 1135, each of BRS16-BRS23 are transmitted. Additional groups similar to 1135 may be transmitted spaced apart by an interval of 4T, as indicated by 1137.

As a non-limiting example, the small-cell AP 106 may configured to perform multiple BRS transmissions in time periods that may at least partly overlap. For instance, the small-cell AP 106 may comprise and/or may be configured to support three analog beam-formers, each of which may be used for a different pencil cell supported by the small-cell AP 106. The first beam-former may be used by the small-cell AP 106 for transmission of the BRS0-BRS7 according to the example 1110. In addition, the second beam-former may be used for transmission of the BRS8-BRS15 according to the example 1120 and the third beam-former may be used for transmission of the BRS16-BRS23 according to the example 1130. Accordingly, in this example of transmission of three BRSs in overlapping time periods, the small-cell AP 106 may transmit up to three different BRS simultaneously and may transmit BRSs according to different periodicity parameters. It should be noted that embodiments are not limited by this example, as any suitable number of RF chains and/or analog beam-formers may be used, and any suitable arrangement of BRS transmission times may also be used. For instance, periodicity parameters used for each of the RF chains and/or analog beam-formers may or may not be different in some arrangements. As described previously, the periodicity used for each pencil cell may be varied according to a number of UEs 102 supported by the pencil cell and/or traffic loading of the pencil cell.

In some embodiments, the UE 102 may perform two levels of cell detection and measurement. As an example, the first level may be used for detection and measurement of mmW APs 106 by searching cmW APRSs. The second level may be used to measure mmW pencil cells by detection BRSs. Cell IDs of the reference signals (APRS and/or BRS) that the UE 102 is to search may be determined by the eNB 104 and may be signaled to the UE 102. The selected beam cell ID list for the second level measurement may be based on uld also be noted that embodiments are not limited to the com In some embodiments, the first level cell detection may enable the UE 102 to discover an mmW AP 106 without the need for beam acquisition. The second level cell detection and measurement may be performed, in some cases, using only the BRSs signaled by the eNB 104. Accordingly, the UE 102 may not need to perform exhaustive initial pencil cell searches for all possible pencil cells from all possible mmW APs 106, in some cases.

As an example, the eNB 104 may select one or more mmW pencil cells based at least partly on reported BRS signal quality measurements. The eNB 104 may configure the selected pencil cells as secondary component cells. Accordingly, the downlink beam acquisition may be inherently realized by the pencil cell allocation. The configured mmW pencil cells may be supported by one or more mmW APs 106, in some cases. Accordingly, CoMP may be supported in some cases.

As an example, a number of configured secondary component cells, which may include small-cell APs 106 and/or pencil cells, may be larger than a number of supported secondary cells (SCells). For instance, the number of supported SCells may be related to a standard, although embodiments are not limited as such. In such cases, the number of supported SCells may be increased (in the standard or otherwise) and/or SCells may be further aggregated with their own secondary cells. For instance, such cells may be "order-2 secondary cells" or similar in accordance with a hierarchical cell/carrier aggregation arrangement.

In some embodiments, pencil cells may be selected as SCells using any suitable technique. As an example, the eNB 104 may define a threshold Tbrs and pencil cells with reported RSRP/RSRQ (or other measurement) above the threshold Tbrs may be selected as secondary cells. Referring to operation 840 (FIG. 8), this technique may be referred to in FIG. 8 as "method C1."

As another example, multiple thresholds may be defined, which may help to avoid frequent SCell reconfiguration due to environmental variation. The thresholds for k=1, 2, ... K may be Tbrs-1, Tbrs-2, ... Tbrs-K, for which Tbrs-1>Tbrs-2> ... Tbrs-K. Each threshold Tbrs-k may be used to define a pencil cell cluster which comprises Bk adjacent pencil cells centered about the pencil cell with reported RSRP/RSRQ measurements greater than Tbrs-k. It may be plausible to define B1>B2> ... >Bk. The variable p_j (for j=1, ... L) may define the L BRSs reported by the UE 102 to the eNB 104, each of which has a reported RSRP/RSRQ greater than one of the thresholds Tbrs-k. The eNB 104 may select L pencil cell clusters defined as P_i, with i=1, ... L, as the secondary cells for the UE 102. That is, P_i may include a number of adjacent beam cells centered around the pencil cell p_i, and the number of pencil cells in P_i may depend on which threshold the reported RSRP/RSRQ is above. The pencil cells other than p_i included in P_i may be referred to as "guard beams" in some cases. Referring to operation 840 (FIG. 8), this technique may be referred to in FIG. 8 as "method C2." It should be noted that some embodiments may include one or more of the operations and/or techniques described in this example, and some embodiments may include additional operations and/or techniques.

As another example, secondary component pencil cells may be reconfigured to support mobility. When updated APRS and/or BRS signal quality measurements are reported from a moving or mobile UE 102 to the eNB 104, reconfiguration and/or reselection of the secondary component cells may be performed by the eNB 104. As previously described, guard beams may be used. In addition, in some cases, the guard beams may have a potential to become "anchor beams" for which the reported RSRQ/RSRP (or other measurement) may be above defined thresholds. A current configured group of secondary pencil cells may be defined as P_current. Based on updated BRS signal quality measurements, a new set P_new of pencil cells may be determined using previously described techniques and/or other techniques. An intersection set P_work may include an intersection of the sets P_current and P_new. Sets of selection metrics O_current and O_new may be determined for the sets P_current and P_new, respectively. As a non-limiting example of such, each selected pencil cell in the set may be given a weight factor according to its reported signal quality measurement. In addition, some pencil cells not reported may be given a predetermined minimum weight factor in some cases. As an example, when a ratio of O_current and O_new is below a particular threshold T (which may or may not be predefined), the beam cell reconfiguration may be performed. This example is not limiting, however, as other suitable comparison operations and/or other operations may be performed on the sets O_current and O_new to determine whether or not the beam cell reconfiguration is to be performed. Referring to operation 865 (FIG. 8), this technique may be referred to in FIG. 8 as "method R1." It should be noted that some embodiments may include one or more of the operations and/or techniques described in this example, and some embodiments may include additional operations and/or techniques.

It should be noted that a handoff and/or handover of pencil cells may be inherently implemented as a result of such reconfiguration methods, in some cases. It should be noted that one or more operations included in the examples just described (such as the reconfiguration of secondary component pencil cells and selection of pencil cells as SCells) may be included in some embodiments, including but not limited to the methods 600, 700, and 900 and the scenario 800 shown in FIG. 8.

In Example 1, an apparatus for User Equipment (UE) may comprise transceiver circuitry and hardware processing circuitry. The hardware processing circuitry may configure the transceiver circuitry to receive one or more access point reference signals (APRS) from one or more small-cell access points (AP). The hardware processing circuitry may further configure the transceiver circuitry to transmit, to a macro-cell Evolved Node-B (eNB), one or more AP signal quality measurements based on the reception of the APRSs. The hardware processing circuitry may further configure the transceiver circuitry to receive, from the macro-cell eNB, a pencil cell control message that indicates one or more candidate pencil cells for which the UE is to determine signal quality measurements, the candidate pencil cells supported by the small-cell APs. The hardware processing circuitry may further configure the transceiver circuitry to receive, from the small-cell APs, beam reference signals (BRS) for the candidate pencil cells.

In Example 2, the subject matter of Example 1, the hardware processing circuitry to further configure the transceiver circuitry to refrain from reception of BRSs from the small-cell APs for pencil cells not included in the pencil cell control message.

In Example 3, the subject matter of one or any combination of Examples 1-2, wherein beam-widths of the APRSs may be larger than beam-widths of the BRSs.

In Example 4, the subject matter of one or any combination of Examples 1-3, wherein the beam-widths of the APRSs may be at least 90 degrees and the beam-widths of the BRSs may be at most 15 degrees.

In Example 5, the subject matter of one or any combination of Examples 1-4, wherein for at least one of the small-cell APs, a coverage area of the APRS for the small-cell AP may be larger than a combined coverage area that comprises coverage areas of BRSs for multiple pencil cells supported by the small-cell AP.

In Example 6, the subject matter of one or any combination of Examples 1-5, wherein the pencil cell control message may be received in macro-cell channel resources at a first centimeter wave (cmW) frequency. The APRSs may be received in small-cell channel resources at a second cmW frequency. The BRSs may be received in pencil cell channel resources at a millimeter wave (mmW) frequency.

In Example 7, the subject matter of one or any combination of Examples 1-6, wherein a coverage area of the macro-cell eNB may be larger than a combined coverage area that comprises coverage areas of the small-cell APs.

In Example 8, the subject matter of one or any combination of Examples 1-7, wherein at least some of the candidate pencil cells may be supported by different small-cell APs.

In Example 9, the subject matter of one or any combination of Examples 1-8, wherein at least some of the candidate pencil cells may be supported by a same small-cell AP.

In Example 10, the subject matter of one or any combination of Examples 1-9, wherein at least one of the small-cell APs may support multiple candidate pencil cells for which assigned BRSs are different.

In Example 11, the subject matter of one or any combination of Examples 1-10, the hardware processing circuitry to further configure the transceiver circuitry to transmit, to the macro-cell eNB, pencil cell signal quality measurements based on the reception of the BRSs. The hardware processing circuitry may further configure the transceiver circuitry to receive, from the macro-cell eNB, a pencil cell configuration message that indicates one of the candidate pencil cells that is selected, by the macro-cell eNB, for exchanging of data messages with the UE. The hardware processing circuitry may further configure the transceiver circuitry to receive, according to the selected candidate pencil cell, a data message from a corresponding small-cell AP that supports the selected candidate pencil cell.

In Example 12, the subject matter of one or any combination of Examples 1-11, the hardware processing circuitry to configure the transceiver circuitry to transmit, to the macro-cell Evolved Node-B (eNB), updated pencil cell signal quality measurements for the candidate pencil cells. The hardware processing circuitry may further configure the transceiver circuitry to receive, from the macro-cell eNB, a pencil cell reconfiguration message that indicates a reconfiguration, by the UE, from the selected candidate pencil cell to a reconfigured candidate pencil cell for exchanging of data messages with the UE. The hardware processing circuitry may further configure the transceiver circuitry to receive, according to the reconfigured candidate pencil cell, a data message from a corresponding small-cell AP that supports the reconfigured candidate pencil cell.

In Example 13, the subject matter of one or any combination of Examples 1-12, the hardware processing circuitry to further configure the transceiver circuitry to receive, from the macro-cell eNB, a small-cell AP control message that indicates the small-cell APs from which the UE is to receive the APRSs.

In Example 14, the subject matter of one or any combination of Examples 1-13, wherein the pencil cell control message may further indicate BRSs that are assigned to the candidate pencil cells.

In Example 15, the subject matter of one or any combination of Examples 1-14, wherein the UE may be arranged to operate according to a Third Generation Partnership Project (3GPP) Long Term Evolution (LTE) protocol to exchange messages with the macro-eNB.

In Example 16, the subject matter of one or any combination of Examples 1-15, wherein the apparatus may further include one or more antennas coupled to the transceiver circuitry for the reception of the pencil control message and for the transmission of the AP signal quality measurements.

In Example 17, a non-transitory computer-readable storage medium may store instructions for execution by one or more processors to perform operations for communication by a User Equipment (UE). The operations may configure the one or more processors to receive, from a macro-cell Evolved Node-B (eNB), a request to determine small-cell signal quality measurements based on a reception, at the UE, of access point reference signals (APRS) from one or more small-cell access points (AP). The operations may further configure the one or more processors to transmit, to the macro-cell eNB, small-cell signal quality measurements that are determined by the UE. The operations may further configure the one or more processors to receive, from the macro-cell eNB, a request to determine pencil cell signal quality measurements for a group of candidate pencil cells supported by at least a portion of the small-cell APs. The pencil cell signal quality measurements may be based on a reception, at the UE, of directional beam reference signals (BRS) from the small-cell APs according to the candidate pencil cells.

In Example 18, the subject matter of Example 17, the operations to further configure the one or more processors to receive BRSs from the small-cell APs according to pencil cells included in the group of candidate pencil cells. The operations may further configure the one or more processors to refrain from reception of BRSs from the small-cell APs according to pencil cells not included in the group of candidate pencil cells.

In Example 19, the subject matter of one or any combination of Examples 17-18, the operations to further configure the one or more processors to transmit, to the macro-cell eNB, pencil cell signal quality measurements that are determined by the UE. The operations may further configure the one or more processors to receive, from the macro-cell eNB, an indicator of a candidate pencil cell selected by the eNB for exchanging of data messages with the UE. The operations may further configure the one or more processors to receive a data message, according to the selected candidate pencil cell, from a corresponding small-cell AP that supports the selected candidate pencil cell.

In Example 20, the subject matter of one or any combination of Examples 17-19, wherein a first centimeter wave (cmW) frequency may be used for the reception of the requests from the macro-cell eNB. A second cmW frequency may be used for the reception of the APRSs. A millimeter wave (mmW) frequency may be used for the reception of the BRSs.

In Example 21, an apparatus for an Evolved Node-B (eNB) may comprise transceiver circuitry and hardware processing circuitry. The hardware processing circuitry may configure the transceiver circuitry to transmit, to a User Equipment (UE), a small-cell measurement request that indicates one or more small-cell access points (AP) for which the UE is to determine small-cell signal quality measurements. The hardware processing circuitry may further configure the transceiver circuitry to receive the small-cell signal quality measurements from the UE. The hardware processing circuitry may further configure the transceiver circuitry to transmit, to the UE, a pencil cell measurement request that indicates a group of candidate pencil cells for which the UE is to determine pencil cell signal quality measurements. At least a portion of the small-cell APs may be arranged to support multiple pencil cells for directional transmission of data messages to the UE.

In Example 22, the subject matter of Example 21, wherein the hardware processing circuitry may be configured to determine the group of candidate pencil cells from pencil cells supported by the small-cell APs. The determination may be based at least partly on the received small-cell signal quality measurements.

In Example 23, the subject matter of one or any combination of Examples 21-22, wherein the determination of the group of candidate pencil cells may be further based at least partly on a geographic layout of the pencil cells and directional beam patterns of the pencil cells.

In Example 24, the subject matter of one or any combination of Examples 21-23, the hardware processing circuitry to further configure the transceiver circuitry to receive the pencil cell signal quality measurements from the UE. The hardware processing circuitry may be configured to select a candidate pencil cell for exchanging of data messages with the UE. The selection may be based at least partly on the received pencil cell signal quality measurements. The hardware processing circuitry may further configure the transceiver circuitry to transmit, to the UE, an indicator of the selected candidate pencil cell.

In Example 25, the subject matter of one or any combination of Examples 21-24, wherein the measurement requests may be transmitted in macro-cell channel resources at a first centimeter wave (cmW) frequency. The small-cell signal quality measurements may be based on signals transmitted by the small-cell APs in small-cell channel resources at a second cmW frequency. The pencil cell signal quality measurements may be based on directional signals transmitted by the small-cell APs in pencil cell channel resources at a millimeter wave (mmW) frequency.

In Example 26, the subject matter of one or any combination of Examples 21-25, wherein the eNB may be configured to operate as a macro-cell eNB for which a coverage area may be larger than a combined coverage area that comprises coverage areas of the small-cell APs.

In Example 27, the subject matter of one or any combination of Examples 21-26, wherein the apparatus may further include one or more antennas coupled to the transceiver circuitry for the transmission of the measurement requests and for the reception of the small-cell signal quality measurements.

In Example 28, an apparatus for a small-cell access point (AP) may comprise transceiver circuitry and hardware processing circuitry. The hardware processing circuitry may configure the transceiver circuitry to transmit an access point reference signal (APRS) in APRS channel resources at a centimeter wave (cmW) frequency. The hardware processing circuitry may further configure the transceiver circuitry to transmit multiple beam reference signals (BRS) in BRS channel resources at a millimeter wave (mmW) frequency, wherein the BRSs are assigned to multiple directional pencil cells supported by the small-cell AP. The hardware processing circuitry may further configure the transceiver circuitry to receive an indication that one of the pencil cells is selected for usage by the small-cell AP for transmission of data messages to a User Equipment (UE). The hardware processing circuitry may further configure the transceiver circuitry to transmit a data message to the UE in the BRS channel resources according to a transmission direction assigned to the selected pencil cell.

In Example 29, the subject matter of Example 28, wherein the data message may include a data portion and may further include a control portion that is based on a corresponding BRS that is assigned to the selected pencil cell.

In Example 30, the subject matter of one or any combination of Examples 28-29, wherein a beam-width of the APRS may be larger than beam-widths of the BRSs.

In Example 31, the subject matter of one or any combination of Examples 28-30, wherein the beam-width of the APRS may be at least 90 degrees and the beam-widths of the BRSs may be at most 15 degrees.

In Example 32, the subject matter of one or any combination of Examples 28-31, wherein a coverage area of the APRS may be larger than a combined coverage area that comprises coverage areas of the BRSs.

In Example 33, the subject matter of one or any combination of Examples 28-32, wherein the apparatus may further include one or more antennas coupled to the transceiver circuitry for the transmission of the APRS, the BRSs, and the data message.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for User Equipment (UE), the apparatus comprising transceiver circuitry and hardware processing circuitry, the hardware processing circuitry to configure the transceiver circuitry to:
   receive one or more access point reference signals (APRS) from one or more small-cell access points (AP);
   transmit, to a macro-cell base station, one or more AP signal quality measurements based on the reception of the APRSs;
   receive, from the macro-cell base station, a pencil cell control message that indicates one or more candidate pencil cells for which the UE is to determine signal quality measurements, the candidate pencil cells supported by the small-cell APs; and
   receive, from the small-cell APs, beam reference signals (BRS) for the one or more candidate pencil cells indicated in the pencil cell control message; and
   wherein the processing circuitry is to refrain from processing BRSs from the small-cell APs for pencil cells not indicated in the pencil cell control message.

2. The apparatus according to claim 1, wherein beam-widths of the APRSs are larger than beam-widths of the BRSs.

3. The apparatus according to claim 2, wherein the beam-widths of the APRSs are at least 90 degrees and the beam-widths of the BRSs are at most 15 degrees.

4. The apparatus according to claim 1, wherein for at least one of the small-cell APs, a coverage area of the APRS for the small-cell AP is larger than a combined coverage area that comprises coverage areas of BRSs for multiple pencil cells supported by the small-cell AP.

5. The apparatus according to claim 1, wherein:
   the pencil cell control message is received in macro-cell channel resources at a first centimeter wave (cmW) frequency,
   the APRSs are received in small-cell channel resources at a second cmW frequency, and
   the BRSs are received in pencil cell channel resources at a millimeter wave (mmW) frequency.

6. The apparatus according to claim 1, wherein a coverage area of the macro-cell base station is larger than a combined coverage area that comprises coverage areas of the small-cell APs.

7. The apparatus according to claim 1, wherein at least some of the candidate pencil cells are supported by different small-cell APs.

8. The apparatus according to claim 1, wherein at least some of the candidate pencil cells are supported by a same small-cell AP.

9. The apparatus according to claim 1, wherein at least one of the small-cell APs supports multiple candidate pencil cells for which assigned BRSs are different.

10. The apparatus according to claim 1, the hardware processing circuitry to further configure the transceiver circuitry to:
    transmit, to the macro-cell base station, pencil cell signal quality measurements based on the reception of the BRSs;
    receive, from the macro-cell base station, a pencil cell configuration message that indicates one of the candidate pencil cells that is selected, by the macro-cell base station, for exchanging of data messages with the UE; and receive, according to the selected candidate pencil cell, a data message from a corresponding small-cell AP that supports the selected candidate pencil cell.

11. The apparatus according to claim 10, the hardware processing circuitry to further configure the transceiver circuitry to:
 transmit, to the macro-cell base station, updated pencil cell signal quality measurements for the candidate pencil cells;
 receive, from the macro-cell base station, a pencil cell reconfiguration message that indicates a reconfiguration, by the UE, from the selected candidate pencil cell to a reconfigured candidate pencil cell for exchanging of data messages with the UE; and
 receive, according to the reconfigured candidate pencil cell, a data message from a corresponding small-cell AP that supports the reconfigured candidate pencil cell.

12. The apparatus according to claim 1, the hardware processing circuitry to further configure the transceiver circuitry to receive, from the macro-cell base station, a small-cell AP control message that indicates the small-cell APs from which the UE is to receive the APRSs.

13. The apparatus according to claim 1, wherein the pencil cell control message further indicates BRSs that are assigned to the candidate pencil cells.

14. The apparatus according to claim 1, wherein the UE is arranged to operate according to a Third Generation Partnership Project (3GPP) protocol to exchange messages with the macro-cell base station.

15. The apparatus according to claim 1, wherein the apparatus further includes one or more antennas coupled to the transceiver circuitry for the reception of the pencil control message and for the transmission of the AP signal quality measurements.

16. A non-transitory computer-readable storage medium that stores instructions for execution by one or more processors to perform operations for communication by a User Equipment (UE), the operations to configure the one or more processors to:
 receive, from a macro-cell base station, a request to determine small-cell signal quality measurements based on a reception, at the UE, of access point reference signals (APRS) from one or more small-cell access points (AP);
 transmit, to the macro-cell base station, small-cell signal quality measurements that are determined by the UE; and
 receive, from the macro-cell base station, a request to determine pencil cell signal quality measurements for a group of candidate pencil cells supported by at least a portion of the small-cell APs,
 wherein the pencil cell signal quality measurements are based on a reception, at the UE, of directional beam reference signals (BRS) from the small-cell APs according to the candidate pencil cells;
 receive BRSs from the small-cell APs according to pencil cells included in the group of candidate pencil cells, and
 refrain from processing BRSs from the small-cell APs according to pencil cells not included in the group of candidate pencil cells.

17. The non-transitory computer-readable storage medium according to claim 16, the operations to further configure the one or more processors to:
 transmit, to the macro-cell base station, pencil cell signal quality measurements that are determined by the UE;

receive, from the macro-cell base station, an indicator of a candidate pencil cell selected by the base station for exchanging of data messages with the UE; and
 receive a data message, according to the selected candidate pencil cell, from a corresponding small-cell AP that supports the selected candidate pencil cell.

18. The non-transitory computer-readable storage medium according to claim 16, wherein:
 a first centimeter wave (cmW) frequency is used for the reception of the requests from the macro-cell base station,
 a second cmW frequency is used for the reception of the APRSs, and
 a millimeter wave (mmW) frequency is used for the reception of the BRSs.

19. An apparatus for a base station, the apparatus comprising transceiver circuitry and hardware processing circuitry, the hardware processing circuitry to configure the transceiver circuitry to:
 transmit, to a User Equipment (UE), a small-cell measurement request that indicates one or more small-cell access points (AP) for which the UE is to determine small-cell signal quality measurements;
 receive the small-cell signal quality measurements from the UE; and
 transmit, to the UE, a pencil cell measurement request that indicates a group of candidate pencil cells for which the UE is to determine pencil cell signal quality measurements,
 wherein at least a portion of the small-cell APs are arranged to support multiple pencil cells for directional transmission of data messages to the UE,
 wherein the measurement requests are transmitted in macro-cell channel resources at a first centimeter wave (cmW) frequency,
 wherein the small-cell signal quality measurements are based on signals transmitted by the small-cell APs in small-cell channel resources at a second cmW frequency, and
 wherein the pencil cell signal quality measurements are based on directional signals transmitted by the small-cell APs in pencil cell channel resources at a millimeter wave (mmW) frequency.

20. The apparatus according to claim 19, wherein the hardware processing circuitry is configured to determine the group of candidate pencil cells from pencil cells supported by the small-cell APs, the determination based at least partly on the received small-cell signal quality measurements.

21. The apparatus according to claim 19, wherein the determination of the group of candidate pencil cells is further based at least partly on a geographic layout of the pencil cells and directional beam patterns of the pencil cells.

22. The apparatus according to claim 19, the hardware processing circuitry further configured to:
 configure the transceiver circuitry to receive the pencil cell signal quality measurements from the UE;
 select a candidate pencil cell for exchanging of data messages with the UE, the selection based at least partly on the received pencil cell signal quality measurements; and
 configure the transceiver circuitry to transmit, to the UE, an indicator of the selected candidate pencil cell.

23. The apparatus according to claim 19, wherein:
 the measurement requests are transmitted in macro-cell channel resources at a first centimeter wave (cmW) frequency, the small-cell signal quality measurements are based on signals transmitted by the small-cell APs in small-cell channel resources at a second cmW frequency, and the pencil cell signal quality measurements are based on directional signals transmitted by the small-cell APs in pencil cell channel resources at a millimeter wave (mmW) frequency.

24. The apparatus according to claim 19, wherein the base station is configured to operate as a macro-cell base station for which a coverage area is larger than a combined coverage area that comprises coverage areas of the small-cell APs.

25. The apparatus according to claim 19, wherein the apparatus further includes one or more antennas coupled to the transceiver circuitry for the transmission of the measurement requests and for the reception of the small-cell signal quality measurements.

26. An apparatus for a small-cell access point (AP), the apparatus comprising transceiver circuitry and hardware processing circuitry, the hardware processing circuitry to configure the transceiver circuitry to:

transmit an access point reference signal (APRS) in APRS channel resources at a centimeter wave (cmW) frequency;

transmit multiple beam reference signals (BRS) in BRS channel resources at a millimeter wave (mmW) frequency, wherein the BRSs are assigned to multiple directional pencil cells supported by the small-cell AP;

receive an indication that one of the pencil cells is selected for usage by the small-cell AP for transmission of data messages to a User Equipment (UE); and transmit a data message to the UE in the BRS channel resources according to a transmission direction assigned to the selected pencil cell, wherein a coverage area of the APRS is larger than a combined coverage area that comprises coverage areas of the BRSs.

27. The apparatus according to claim 26, wherein the data message includes a data portion and further includes a control portion that is based on a corresponding BRS that is assigned to the selected pencil cell.

28. The apparatus according to claim 26, wherein a beam-width of the APRS is larger than beam-widths of the BRSs.

29. The apparatus according to claim 28, wherein the beam-width of the APRS is at least 90 degrees and the beam-widths of the BRSs are at most 15 degrees.

30. The apparatus according to claim 26, wherein the apparatus further includes one or more antennas coupled to the transceiver circuitry for the transmission of the APRS, the BRSs, and the data message.

\* \* \* \* \*